(12) United States Patent
Sandmeier

(10) Patent No.: US 8,262,072 B2
(45) Date of Patent: Sep. 11, 2012

(54) WORK PIECE CARRIER FOR EXACTLY POSITIONING A WORK PIECE ON A CHUCK AND CLAMPING APPARATUS WITH A CHUCK AND A WORK PIECE CARRIER

(75) Inventor: Bruno Sandmeier, Seegen (CH)

(73) Assignee: Erowa AG, Reinach (CH)

( * ) Notice: Subject to any disclaimer, the term of this patent is extended or adjusted under 35 U.S.C. 154(b) by 1156 days.

(21) Appl. No.: 11/985,721

(22) Filed: Nov. 16, 2007

(65) Prior Publication Data
US 2009/0179371 A1 Jul. 16, 2009

(30) Foreign Application Priority Data
Dec. 14, 2006 (CH) ........................................ 2030/06

(51) Int. Cl.
| B23Q 3/00 | (2006.01) |
|---|---|
| B23H 1/00 | (2006.01) |
| B23K 9/00 | (2006.01) |
| B25G 3/22 | (2006.01) |
| B23B 31/02 | (2006.01) |
| B23B 31/06 | (2006.01) |

(52) U.S. Cl. ............................ 269/309; 279/14; 279/143
(58) Field of Classification Search .................. 269/309; 279/14, 75, 82, 83, 143; 219/69.11
See application file for complete search history.

(56) References Cited

U.S. PATENT DOCUMENTS

| 3,023,015 A | | 2/1962 | Pankow | |
|---|---|---|---|---|
| 4,075,302 A | * | 2/1978 | Brady et al. | ...................... 264/43 |
| 6,089,557 A | * | 7/2000 | Obrist | ............................ 269/309 |
| 6,206,357 B1 | * | 3/2001 | Peck | ............................... 269/309 |
| 6,641,128 B2 | * | 11/2003 | Fries | .............................. 269/309 |
| 6,799,758 B2 | * | 10/2004 | Fries | .............................. 269/309 |
| 6,860,477 B2 | * | 3/2005 | Etter | ............................... 269/309 |
| 6,935,637 B2 | * | 8/2005 | Cantlon | ........................... 279/75 |
| 6,997,448 B2 | * | 2/2006 | Roth et al. | ..................... 269/309 |
| 7,029,213 B2 | * | 4/2006 | Yerly | .............................. 409/218 |
| 7,303,195 B2 | * | 12/2007 | Nie | ................................ 279/133 |

FOREIGN PATENT DOCUMENTS

| DE | 861948 | 1/1953 |
|---|---|---|
| EP | 0255042 A1 | 2/1988 |
| EP | 0900618 A1 | 3/1999 |
| EP | 0970769 A2 | 1/2000 |
| EP | 1068919 A1 | 1/2001 |
| EP | 1442832 A1 | 8/2004 |

* cited by examiner

*Primary Examiner* — Lee D Wilson
*Assistant Examiner* — Alvin Grant
(74) *Attorney, Agent, or Firm* — Maginot, Moore & Beck, LLP

(57) ABSTRACT

A work piece carrier is provided with two reference systems for accurately positioning it with regard to a chuck member. The work piece carrier comprises a central aperture with the two opposite ends of the aperture surrounded by one of the reference systems. The two reference systems are independent from each other and allow the work piece carrier to be attached to the chuck member in two different positions. Assigned to each reference system is a protrusion surrounding the central aperture and extending substantially in the direction of the central longitudinal axis of the work piece carrier. The particular protrusion is provided with a shoulder serving as a clamping surface, adapted to be engaged by clamping elements provided in the chuck member. Preferably, also the centering elements for defining the position of the work piece carrier with regard to the chuck member are located on the particular protrusion.

20 Claims, 3 Drawing Sheets

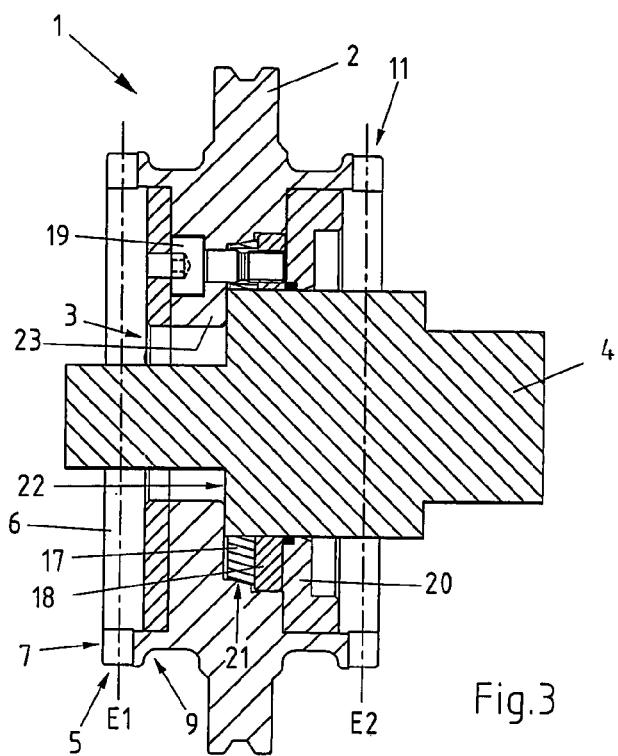
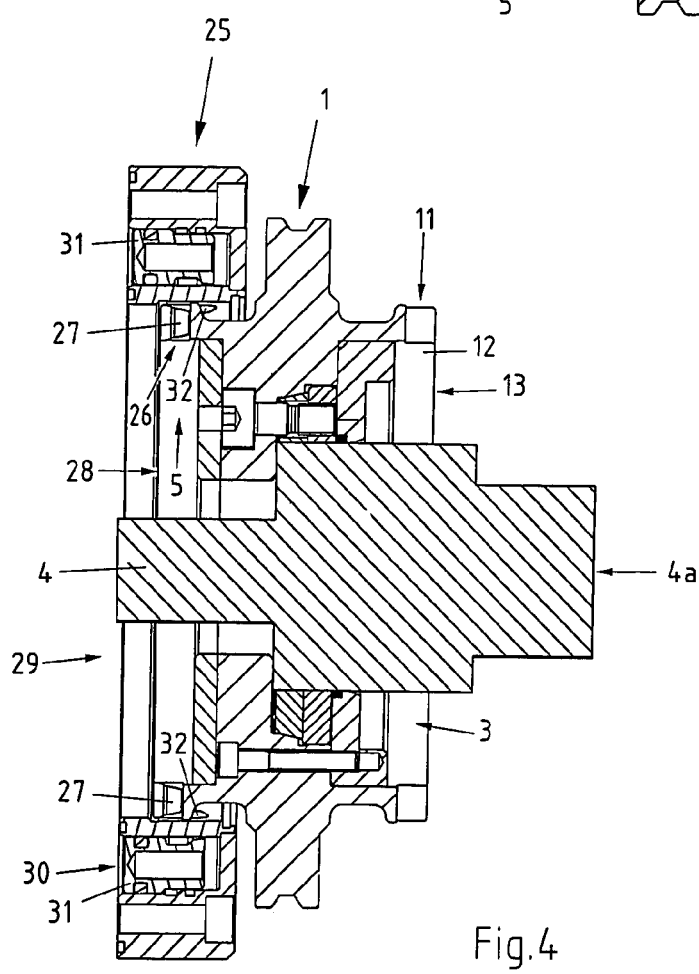
Fig.3
Fig.4

WORK PIECE CARRIER FOR EXACTLY POSITIONING A WORK PIECE ON A CHUCK AND CLAMPING APPARATUS WITH A CHUCK AND A WORK PIECE CARRIER

BACKGROUND

The present invention refers to a work piece carrier, having a central aperture for receiving the work piece as well as two reference systems, each incorporating positioning elements, to releaseably attach the work piece carrier to a chuck member in two different, well defined positions. The present invention also refers to a clamping apparatus, comprising a chuck member and a work piece carrier that can be attached thereto in two different positions.

Well known in the prior art are clamping apparatuses to attach a work piece to a chuck member of a machine tool with high precision by means of a work piece carrier. Thereby, the work piece carrier shall not only be attached to the chuck member with high absolute precision, but particularly also a high repetitional accuracy. In order to enable the work piece carrier to be attached to a chuck member in an exactly defined position, the work piece carrier usually is provided with a reference system that is matched to a reference system provided in the chuck member; in other words, the reference system of the chuck member is correspondingly designed. Once the work piece carrier is attached to the chuck member, the work piece carrier shall take an exact, well defined and well known position at least in the X- and Y-directions. Preferably, the work piece carrier should also be aligned in the Z-direction as well as regarding its angular orientation around the Z-axis once it is attached to the chuck member.

The European Patent Publication EP-A-0,255,042 discloses a clamping apparatus for a tool of a machining apparatus, comprising a chuck member and a tool holder. The chuck member is provided with two pairs of centering ribs protruding from its bottom surface and having rest surfaces for aligning the tool holder in the X- and Y-direction. Moreover, four pins are provided, protruding from the surface of the chuck member, which are responsible for aligning the tool holder in the Z-direction. The tool holder is provided with a flat surface adapted to rest against the front faces of the above mentioned pins. Further, the tool holder comprises two pairs of grooves, aligned with the aforementioned centering ribs, and having elastic lips adapted to engage the rest surfaces of the aligning ribs. Finally, the tool holder is provided with a central bore in which a pull-down bolt is received, by means of which the pull-down force required for a positionally accurate centering of the tool holder can be transformed to the tool holder. Thereby, the chuck member comprises a centrally located ball clamping mechanism cooperating with the above mentioned pull-down bolt.

A disadvantage of such a known apparatus is, amongst else, that a work piece fixed to the work piece carrier can be machined only on one side. If, for example, a work piece has to be machined on two sides, it has to be released from the work piece carrier once the one side has been machined, and fixed to the work piece carrier again in a different position in which the other side can be machined. It is understood that such a proceeding, on the one hand, is time consuming and, on the other side, brings along inaccuracies as far as the exact position of the work piece is concerned.

The German Patent Publication DE-C-861,948 discloses a chuck member to be attached to the spindle of a machine tool which can be turned over from one position into a second position. The chuck member comprises a clamping frame provided with clamping jaws. The clamping frame is swivel-mounted by means of two bolts to be turned over by 180°, such that work pieces clamped in the clamping frame can be turned over by 180°. For positioning the clamping frame with regard to the spindle head, the latter one is provided with an annular rib, engaging annular grooves provided on both sides of the clamping frame. For fixing the clamping frame to the spindle head, the clamping frame is provided with holding elements which are engaged in each case by a screw bolt. The screw bolts are connected to a carrier member which is movable between a turn-over position and an operating position by means of a rotating and, thereby, axially moving sleeve member. Moreover, the holding elements each comprise a protruding portion, shaped correspondingly to a matching recess provided in the spindle head to secure the clamping frame against rotation once it is in its operating position.

Even if the annular rib engaging the assigned annular groove allows for some kind of positioning of the clamping frame with regard to the spindle head, no means are provided for exactly and accurately aligning the clamping frame with regard to the spindle head both in the X- and Y-directions as well as in the Z-direction. By providing independent centering elements, particularly the protruding portions engaging the recesses, as well as the annular rib engaging one of the annular grooves, the system is over determined. Moreover, the chuck member cannot be released from the spindle and, if required, attached to the spindle of another machine tool. Since the clamping frame is held only by means of two screw bolts, no high forces can be transmitted, particularly not during machining a work piece received in the clamping frame. A further disadvantage may be seen in the fact that a work piece received in the clamping frame is limited in size; if it is too large, particularly too long, the clamping frame cannot be turned over by 180° anymore without removing the work piece.

The Document EP-A-0,900,618 discloses a carrier plate having two flattened portions. The rearward portion comprises two holders located opposite to each other by means of which the carrier plate can be clamped to the chuck member in two different positions. The holders are designed according to the previously discussed document EP-A-0,255,042 and are attached to the chuck member by means of a centrally located clamping bolt.

U.S. Pat. No. 3,023,015 discloses a reversible bit attachment for a drill, comprising a tubular holder having an open forward end and a rear end. Drill chuck engaging means are provided on the rear end of the holder. A dual bit member comprises a dual socket having first and second ends which are optionally engageable in the open end of the holder. An annular stop shoulder intermediate the ends of the socket is engageable with the forward end of the holder. Releasable detent means are provided, having cooperating components on opposite sides of the holder and on opposite sides of the dual socket. A sleeve is slidably circumposed on the holder and operatively engageable with components of the detent means.

Finally, the document EP-A-0,970,769 discloses a holder for drill tools, having a central through bore constituting on each side an axial receiving hole for receiving a drill bit. The holder is provided with a radial blind hole, intersecting the two receiving holes and serving for constituting or receiving a stop member for securing the drill bit against rotation.

SUMMARY OF THE INVENTION

It is an object of the present invention to provide a work piece carrier having a central aperture of the kind referred to herein above which can be attached to different chuck members quickly, simply, and in different positions, whereby the particular position is accurately defined and well known. Nevertheless, such a work piece holder shall be of simple and rigid design.

To meet this and other objects, the present invention provides a work piece carrier adapted to be releaseably attached to a chuck member. The carrier comprises a central aperture extending in the direction of its central longitudinal axis and adapted to receive a work piece. A first reference system is provided with first centering elements and adapted to align the work piece carrier with regard to the chuck member in a first accurately defined position. A second reference system is provided with second centering elements and adapted to align the work piece carrier with regard to the chuck member in a second accurately defined position.

First connecting means are assigned to the first reference system for releaseably attaching the work piece carrier to the chuck member in said first position, whereby the first connecting means surround the central aperture in the work piece carrier and extend substantially in the direction of the central longitudinal axis of the work piece carrier, and second connecting means independent of the first connecting means are assigned to the second reference system for releaseably attaching the work piece carrier to the chuck member in said second position, whereby the second connecting means surround the central aperture in the work piece carrier and extend substantially in the direction of the central longitudinal axis of the work piece carrier.

Due to the fact that the work piece carrier is provided with two reference systems that are independent of each other, whereby means for fixing the work piece carrier to the chuck member, extending substantially in the direction of the central longitudinal axis of the work piece carrier and surrounding this central opening, are assigned to each reference system, the fundamental prerequisite is created that the work piece carrier can be attached to a chuck member quickly, simply, safely and in an accurate, well defined position without the use of a centrally located clamping bolt member.

According to a second aspect, the present invention provides a clamping apparatus with a chuck member and a work piece carrier adapted to be releaseably attached to the chuck member. The chuck member is provided with a reference system for defining the position of a work piece carrier attached to the chuck member as well as with clamping elements for clampingly hold a work piece carrier attached to the chuck member. The work piece carrier comprises a central aperture extending in the direction of its central longitudinal axis and is adapted to receive a work piece. The carrier comprises a first reference system provided with first centering elements and adapted to cooperate with the reference system of the chuck member to align the work piece carrier with regard to the chuck member in a first accurately defined position.

Further, the work piece carrier comprises a second reference system provided with second centering elements and adapted to cooperate with the reference system of the chuck member to align the work piece carrier with regard to the chuck member in a second accurately defined position.

First connecting means assigned to the first reference system are provided for releaseably attaching the work piece carrier to the chuck member in said first position. The first connecting means surround the central aperture in the work piece carrier, extend substantially in the direction of the central longitudinal axis of the work piece carrier, and have a clamping surface adapted to be engaged by the clamping elements of the chuck member. Second connecting means independent of the first connecting means and assigned to the second reference system are provided for releaseably attaching the work piece carrier to the chuck member in said second position. The second connecting means surround the central aperture in the work piece carrier, extend substantially in the direction of the central longitudinal axis of the work piece carrier, and have a clamping surface adapted to be engaged by the clamping elements of the chuck member.

DESCRIPTION OF THE FIGURES

In the following, an embodiment of the apparatus according to the invention will be further described, with reference to the accompanying drawings, in which:

FIG. 3 shows a longitudinal sectional view of the work piece carrier, together with a work piece clamped therein;

FIG. 4 shows a longitudinal sectional view of a chuck member and of a work piece carrier attached thereto in a first position.

DESCRIPTION OF THE ILLUSTRATED EMBODIMENT

Figure 1:
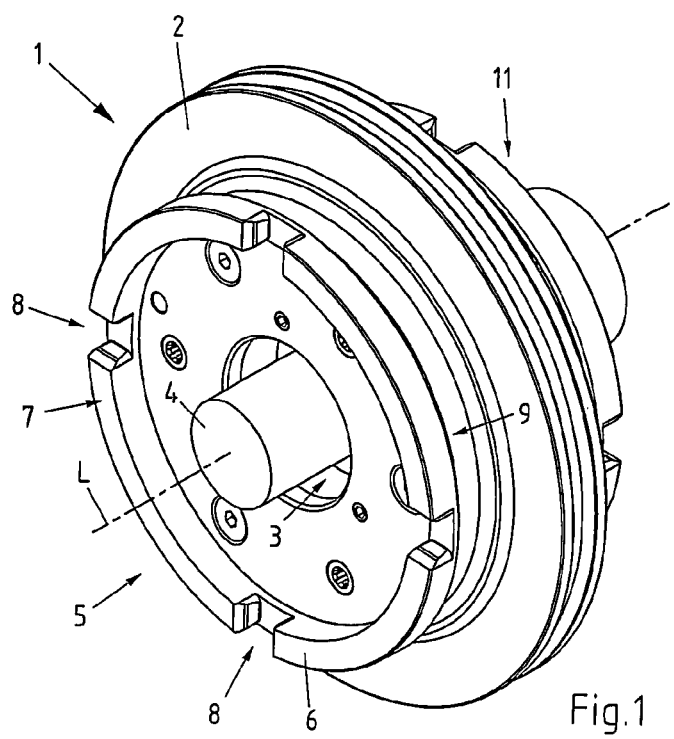
FIG. 1 shows a perspective view of the work piece carrier, seen from one side.

FIG. 1 shows the work piece carrier 1, together with a work piece 4 clamped therein, in a perspective view from one side. The work piece carrier comprises a circular, disk-like base body member 2 which is provided with a central aperture 3. The diameter of the aperture 3 is not constant, but the aperture 3 has a portion with a first, smaller diameter and a portion with a second, larger diameter. The work piece carrier 1 is provided with two reference systems 5, 11, located opposite to each other on the two sides of the work piece carrier 1. In FIG. 1, the first reference system 5 is fully visible, while only a portion of the second reference system 11 can be seen. The first reference system 5 comprises a protrusion 6 having essentially annular shape, extending parallel to and coaxial with the central longitudinal axis L of the work piece carrier 1. Simultaneously, the central longitudinal axis L of the work piece carrier 1 constitutes the Z-axis of the work piece carrier 1.

The front face 7 of the protrusion 6 is provided with a number of centering elements; in the present example, the centering elements are constituted by four centering grooves 8 evenly distributed around the central aperture 3 and provided in the front face 7 of the protrusion 6. These centering grooves 8 serve for positioning the work piece carrier 1 with regard to a chuck member (not shown in FIG. 1) in the X- and Y-directions as well as with regard to its angular orientation around the Z-axis. Simultaneously, the flat front face portions 7 of the annular protrusion 6 serve as a stop surface in the Z-direction upon clamping the work piece carrier 1 to a (not shown) chuck member.

As can be seen in FIG. 1, the one end region of the central aperture 3 is radially surrounded by the first reference system 5. The rear side of the protrusion 6, opposite to the front face portions 7, exhibits an annular shoulder portion 9 extending along the periphery of the protrusion 6, serving as a clamping surface. This shoulder can be engaged by clamping balls of a chuck member, as will be further explained herein after in connection with FIG. 4.

It should be noted that the above mentioned annular protrusion 6, coaxially surrounding the central aperture 3, comprises not only the centering elements 8 adapted to accurately position the work piece carrier 1 in the X- and Y-directions with regard to a chuck member, but also the stop surfaces 7 for positioning the work piece carrier 1 in the Z-direction as well as the shoulder 9 serving as a clamping surface to be engaged by clamping elements incorporated in a chuck member. Thus, the protrusion 6 combines several elements serving for different functions, whereby the centering elements in the shape of grooves 8 and the stop surfaces 7 serving as the Z-axis stop surfaces constitute the first reference system 5. The shoulder 9 establishing the clamping surface, thereby, is directly correlated to the first reference system 5. Such a work piece carrier 1 is of particularly simple design.

In the present example, the work piece carrier is constituted by an axially symmetrical body member; thus, it is also particularly well suited to be used in a lathe.

It should be noted that other elements can be provided that serve as centering elements; for example, instead of centering grooves, centering pins can be used.

Figure 2:
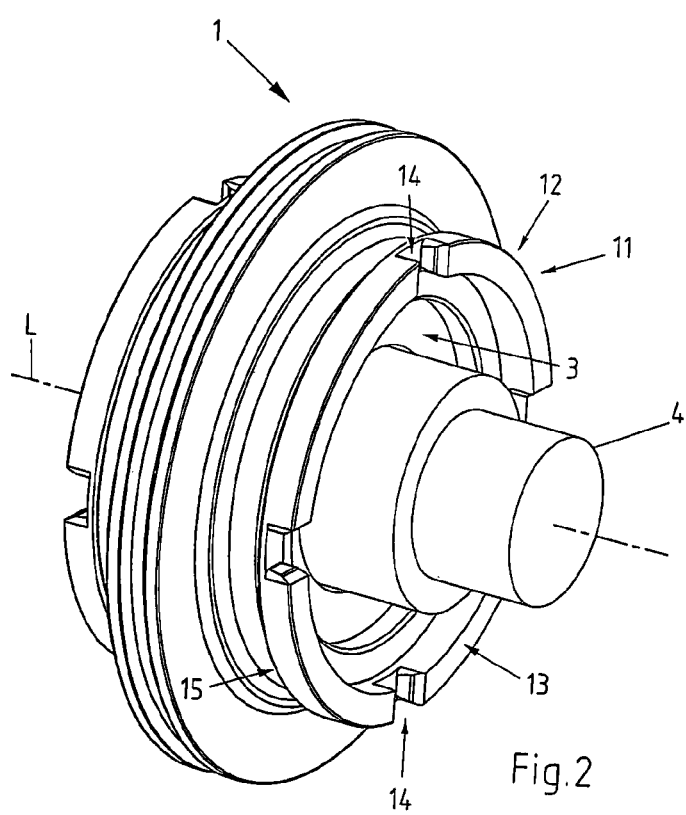
FIG. 2 shows a perspective view of the work piece carrier, seen from the other side.

FIG. 2 shows the work piece carrier 1, together with a work piece 4 clamped therein, in a perspective view from the other side, as compared to the view shown in FIG. 1. In FIG. 2, the second reference system 11 is shown in more detail. Again, the second reference system 11 comprises a protrusion 12 having essentially annular shape, extending parallel to and coaxial with the central longitudinal axis L of the work piece carrier 1. The front face 13 of the protrusion 12 is provided with a number of centering elements; in the present example, the centering elements are constituted by four centering grooves 14 evenly distributed around the central aperture 3 and provided in the front face 13 of the protrusion 12.

As is the case with the previously described first reference system 5, the centering grooves 14 of the second reference system 11 again serve for positioning the work piece carrier 1 with regard to a chuck member (not shown in FIG. 1) in the X- and Y-directions as well as with regard to its angular orientation around the Z-axis. Simultaneously, the flat front face portions 13 of the annular protrusion 12 serve as a stop surfaces in the Z-direction upon clamping the work piece carrier 1 to a (not shown) chuck member. As can be seen in FIG. 2, the other end region, as compared to the view shown in FIG. 1, of the central aperture 3 is radially surrounded by the second reference system 11. The rear side of the protrusion 12, opposite to the front face portions 13, exhibits an annular shoulder portion 15 extending along the periphery of the protrusion 12, serving as a clamping surface. This shoulder can be engaged by clamping balls of a chuck member, as will be further explained herein after in connection with FIG. 4.

FIG. 3 shows a longitudinal sectional view of the work piece carrier 1, in which a work piece 4 is clamped. In the interior of the work piece carrier 1 and the base body member 2, respectively, means are provided for clamping and positioning a work piece 4. In the present example, these means comprise a slotted clamping ring member 17, a thrust plate member 18 as well as a number of clamping screws 19; it should be noted that FIG. 3 shows only one of the clamping screws 19.

The operating principle of the clamping ring member 17 is similar to the one of a collet; upon tightening the clamping screws 19, the clamping ring member is moved to the left, i.e., in the direction towards the first reference system 5, by means of the thrust plate member 18. Since the clamping ring member 17 is radially surrounded by a thrust surface 21, having conically decreasing diameter towards the first reference system 5, the clamping ring member 17 is radially inwardly compressed by the thrust plate member 18, with the result that the work piece 4 is clamped along its peripheral surface and simultaneously positioned.

As far as the positioning in the Z-direction is concerned, is should be noted that an annular front face 22 of the work piece 4 rests on a protrusion 23 of the base body member 2. Upon tightening the clamping screws 19, the work piece 4 is pressed against this protrusion 23 under the influence of the clamping ring member 17. Thus it is ensured that the work piece 4 and its annular front face 23, respectively, positively rests on the protrusion 23 of the base body member 2 and thereby is positioned in the Z-direction.

Clearly visible in FIG. 3 is also the shoulder 9 located at the rear end of the annular protrusion 6, constituting a clamping surface for clamping balls provided in a chuck member.

In contrast to a turn-over chuck assembly, the work piece carrier 1 according to the invention is fully releaseably attached to the assigned chuck member; in other words, it can be removed from the chuck member whenever required and, if appropriate, attached to another matching chuck member. This is an important characteristic particularly in those cases in which a work piece has to be machined by means of different machine tools. In such a case, with a design according to the present invention, the work piece 4 need not be removed from the work piece carrier 1 and re-inserted into another work piece carrier, thereby avoiding inaccurate positioning of the work piece with regard to the machine tool axes.

In the present example, the two reference systems 5 and 11 are located in two planes E1 and E2, running parallel to each other. However, if appropriate, the planes of the reference systems 5 and 11 could also enclose an angle.

Instead of the described clamping assembly comprising a clamping ring member 17 and a thrust plate member 18, a suitable collet member could be provided of the kind that is well known in the prior art, or another different clamping assembly, even a simple clamping of the work piece 4 to the work piece carrier 1 by means of screws, is possible.

FIG. 4 shows a longitudinal sectional view of a chuck member 25 and a work piece carrier 1, attached to the chuck member 25 and accurately positioned with reference to the chuck member 25 by means of the first reference system 5 provided on the work piece carrier 1. To this end, the chuck member 25 is provided with a reference system 26 as well; that reference system 26 is adapted to cooperate with both the first reference system 5 and the second reference system 11 of the work piece carrier 1.

The reference system 26 of the chuck member 25 comprises four centering pin members 27 as well as several rest surface portions 28, serving as Z-references and adapted to be engaged by the front face portions 7 of the annular protrusion 6 of the work piece carrier 1 to exactly determine the Z-axis position of the work piece carrier 1 with reference to the chuck member 25. Particularly, a total of four curved rest surfaces 28 are provided, each extending between two adjacent centering pins 27. However, in the sectional view of FIG. 4, only one rest surface 28 and two centering pins 27 are visible. Moreover, the chuck member 25 is provided with a central aperture 29 as well as with a ball clamping mechanism 30, which comprises at least one operating piston 31 as well as a plurality of clamping balls 32. In the present example, the operating piston 31 is of annular design and adapted to be actuated hydraulically or pneumatically. The centering pins 27 correspond to the centering grooves 8 of the work piece carrier 1 (FIG. 1), as far as their number and position is concerned.

Upon clamping the work piece carrier 1 to the chuck member 25, the clamping balls 32 are pressed radially inwards under the influence of the operating piston 31, with the result that the clamping balls 32 rest on the shoulder 9 (FIG. 3) of the work piece carrier 1 to pull it in the Z-direction against the chuck member 25. For a more detailed explanation of the operation of the clamping ball mechanism 30, reference is made to U.S. Pat. No. 6,367,814 and U.S. Pat. No. 6,378,877, the disclosure of which is incorporated herein by reference. When the work piece carrier 1 has been loosely attached to the chuck member 25, the centering pins 27 of the chuck member 25 penetrate the centering grooves 8 of the work piece carrier 1; thereby, the work piece carrier 1 is positioned with regard to the chuck member in the X- and Y-directions as well as with regard to its angular position around the Z-axis.

The work piece carrier 1 having been set onto the chuck member 25, there is a small gap between the Z-axis reference surfaces 28 of the chuck member 25 and the Z-axis reference surfaces 7 of the work piece carrier 1, said gap having a size in the region of some hundreds of a millimeter. During the final clamping stage, this gap is reduced to zero by pushing the centering pins 27 of the chuck member 25 further into the centering grooves 8 of the work piece carrier 1. Thereby, with the centering pins being driven into the centering grooves, the natural elasticity of the material of the pins and/or groove walls is turned to account. The result is that the provision of elastically resilient centering elements, as disclosed for example in U.S. Pat. No. 4,855,558 can be avoided. Once finally clamped, the work piece carrier 1 is aligned with regard to the chuck member 25 not only in the X- and Y-directions as well as with regard to its angular rotation around the Z-axis, but also with regard to its Z-axis position. Thereby, the central aperture 29 of the chuck member 25 is coaxial to the central aperture 3 in the work piece carrier 1. Due to the fact that the chuck member 25 is provided with a central aperture 29, the work piece 4 attached to the work piece carrier 1 can extend into that aperture 29.

The work piece being clamped in the chuck member as explained herein above, one side of the work piece can be machined; for example, the front face 4a of the work piece 4 can be ground flat.

Figure 5:
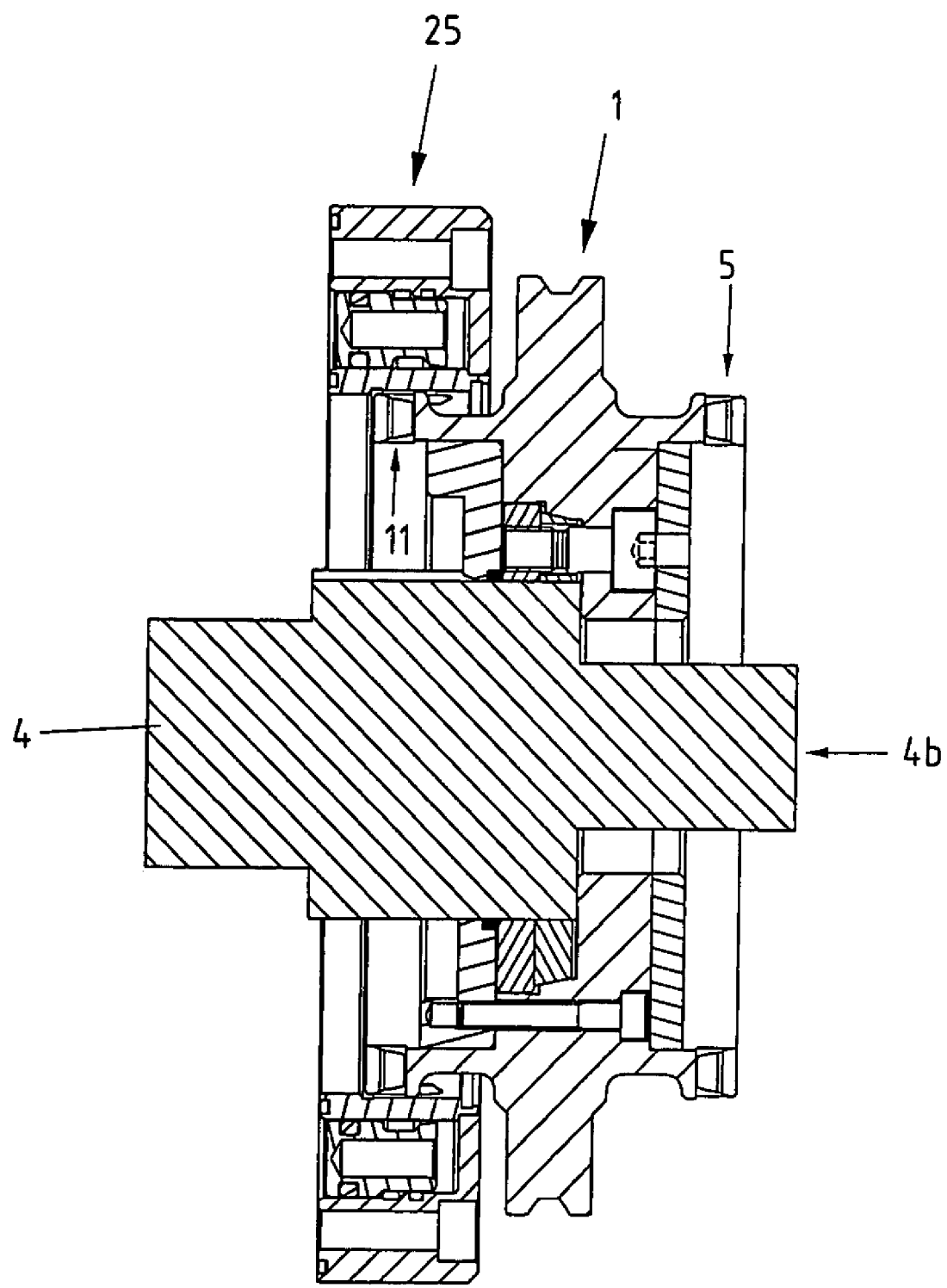
FIG. 5 shows a longitudinal sectional view of a chuck member and of a work piece carrier attached thereto in a second position.

FIG. 5 shows another longitudinal sectional view of a chuck member 25 and a work piece carrier 1, attached to the chuck member 25 and accurately positioned with reference to the chuck member 25 by means of the second reference system 11 provided on the work piece carrier 1. Thereby, the work piece carrier 1 is turned over by 180° as compared to the situation shown in FIG. 3. The clamping of the work piece carrier 1 to the chuck member 25 and its positioning with regard thereto is accomplished exactly as described herein before, except that the centering pins 27 of the chuck member engage the centering grooves 14 assigned to the above mentioned second reference system 11, and the front face portions 13 assigned to the second reference system 11 rest on the Z-axis reference surfaces 28 of the chuck member 25. The work piece 4 being clamped in this second way, the other side of the work piece 4 can be machined; for example, the front face 4b of the work piece 4 can be ground flat, with the result that both front faces 4a and 4b run exactly parallel to each other.

Due to the fact that the clamping balls 32 of the chuck member 25 directly engage the annular protrusion 6 assigned to and being part of the first reference system 5 or the annular protrusion 12 assigned to and being part of the second reference system 11, separate clamping elements provided on the work piece carrier 1, for example clamping bolts or the like, can be avoided. Thus, a particular cost effective manufacture of the work piece carrier is possible. Since each annular protrusion 6, 12 surrounds the central aperture 3 and is provided with an integral peripheral shoulder 9, 15, the clamping elements 32 of the chuck member 25 can engage a comparably large clamping surface to attach the work piece carrier 1 safely and, if appropriate, with high clamping force to the chuck member 25. The provision of a central clamping bolt or pull-in bolt, as used in conventional work piece carriers, is neither required nor possible due to the central aperture. Moreover, the design of the work piece carrier according to the invention ensures a highly accurate positioning thereof with regard to the assigned clamping chuck member.

Within the scope of the present invention, it is understood that it is also possible to provide the work piece carrier with a plurality of protrusions, for example three or four protruding portions, each having essentially the shape of a portion of annulus, instead of providing a single annular protrusion.

What is claimed is:

1. A work piece carrier adapted to be releaseably attached to a chuck member and having a central longitudinal Z axis, comprising:
   a central aperture extending in the direction of the central longitudinal axis and adapted to receive a work piece;
   a first reference system provided with first centering elements arranged to contact the chuck member when the workpiece carrier is attached thereto and adapted to align the work piece carrier with regard to the chuck member in a first accurately defined position;
   a second reference system provided with second centering elements arranged to contact the chuck member when the workpiece carrier is attached thereto and adapted to align the work piece carrier with regard to the chuck member in a second accurately defined position;
   a first protrusion associated with the first reference system for releaseably attaching the work piece carrier to the chuck member in a first position, said first protrusion surrounding the central aperture in the work piece carrier and extending substantially in the direction of the central longitudinal axis of the work piece carrier; and
   a second protrusion independent from the first protrusion and associated with the second reference system for releaseably attaching the work piece carrier to the chuck member in a second position different from said first position, said second protrusion surrounding the central aperture in the work piece carrier and extending substantially in the direction of the central longitudinal axis of the work piece carrier.

2. The work piece carrier according to claim 1 in which said first and second protrusions each define a shoulder constituting a clamping surface and adapted to be engaged by clamping elements provided in the chuck member.

3. The work piece carrier according to claim 2 in which said first and second centering elements for aligning the work piece carrier with regard to the chuck member are located on said one or more protrusion.

4. The work piece carrier according to claim 1 in which said first and said second protrusions each comprise an annular protrusion coaxially surrounding the central opening.

5. The work piece carrier according to claim 4 in which the outer surface of the annular protrusion is provided with a shoulder constituting a clamping surface adapted to be engaged by clamping elements provided in the chuck member.

6. The work piece carrier according claim 2 in which each of said first and second protrusions is provided at least partially with a flat front face portion serving as a Z-axis reference for the chuck member.

7. The work piece carrier according to claim 6 in which said shoulder serving as a clamping surface is provided at a rear side of the flat front face portion.

8. The work piece carrier according to claim 1 in which said first and second reference systems each comprise at least three centering elements by means of which the work piece carrier can be aligned in the X- and Y-directions.

9. The work piece carrier according to claim 1 in which said first reference system is located on one side of the work piece carrier in a first plane, and said second reference system is located on the opposite side of the work piece carrier in a second plane, said first and second planes running parallel to each other.

10. The work piece carrier according to claim 1 in which said first reference system is located on one side of the work piece carrier in a first plane, and said second reference system is located on the opposite side of the work piece carrier in a second plane, said first and second planes defining an angle between each other.

11. A clamping apparatus with a chuck member and a work piece carrier adapted to be releaseably attached to the chuck member, said chuck member having a reference system for defining the position of a work piece carrier attached to the chuck member as well as clamping elements for clampingly hold a work piece carrier attached to the chuck member, said work piece carrier having a central longitudinal axis and comprising:
  a central aperture extending in the direction of the central longitudinal axis and adapted to receive a work piece;
  a first reference system provided with first centering elements and adapted to cooperate with the reference system of the chuck member to align the work piece carrier with regard to the chuck member in a first accurately defined position;
  a second reference system provided with second centering elements and adapted to cooperate with the reference system of the chuck member to align the work piece carrier with regard to the chuck member in a second accurately defined position;
  a first protrusion assigned to the first reference system for releaseably attaching the work piece carrier to the chuck member in a first position, said first protrusion surrounding the central aperture in the work piece carrier, extending substantially in the direction of the central longitudinal axis of the work piece carrier, and having a clamping surface adapted to be engaged by the clamping elements of the chuck member; and
  a second protrusion independent from the first connecting means and assigned to the second reference system for releaseably attaching the work piece carrier to the chuck member in a second position different from said first position, said second protrusion surrounding the central aperture in the work piece carrier, extending substantially in the direction of the central longitudinal axis of the work piece carrier, and having a clamping surface adapted to be engaged by the clamping elements of the chuck member.

12. The clamping apparatus according to claim 11 in which said first and second protrusions are each provided with a shoulder constituting the clamping surface.

13. The clamping apparatus according to claim 11 in which the outer surface of each of said first and second protrusions is provided with a shoulder constituting the clamping surface.

14. The clamping apparatus according to claim 11 in which said first and second centering elements are located along an annulus coaxially surrounding the central opening, whereby the reference system of the chuck member is provided with corresponding centering elements adapted to be engaged by the first and second centering elements of the work piece carrier.

15. The clamping apparatus according to claim 11 in which the front face of at least one of said first and second protrusions is provided with at least three centering elements.

16. The clamping apparatus according to claim 11 in which the front face of at least one of said first and second protrusions is configured as a Z-axis rest surface on which the work piece carrier is supported in the Z-direction upon clamping the work piece carrier to the chuck member.

17. The clamping apparatus according to claim 11 in which the chuck member comprises a central aperture adapted to receive a portion of a work piece attached to the work piece carrier.

18. The clamping apparatus according to claim 17 in which the central aperture of the work piece carrier and the central aperture of the chuck member are coaxial to each other once the work piece carrier is clamped to the chuck member.

19. The clamping apparatus according to claim 11 in which said first reference system of the work piece carrier is located on one side of the work piece carrier in a first plane, and said second reference system is located on the opposite side of the work piece carrier in a second plane, said first and second planes running parallel to each other.

20. The clamping apparatus according to claim 11 in which said first reference system of the work piece carrier is located on one side of the work piece carrier in a first plane, and said second reference system is located on the opposite side of the work piece carrier in a second plane, said first and second planes defining an angle between each other.

* * * * *